United States Patent [19]

Sakura et al.

[11] Patent Number: 4,697,938
[45] Date of Patent: Oct. 6, 1987

[54] MULTI-TINT THERMAL PRINTING APPARATUS CONTROL SYSTEM

[75] Inventors: Yasuhiro Sakura, Mishima; Koichi Haraga, Numazu; Hitoshi Nimura, Shizuoka; Mamoru Ishikawa, Fuji, all of Japan

[73] Assignee: Tokyo Electric Co., Ltd., Tokyo, Japan

[21] Appl. No.: 904,781

[22] Filed: Sep. 4, 1986

Related U.S. Application Data

[63] Continuation of Ser. No. 721,570, Apr. 10, 1985, abandoned.

[30] Foreign Application Priority Data

Apr. 17, 1984 [JP] Japan .................................. 59-76899
Feb. 28, 1985 [JP] Japan .................................. 60-39606

[51] Int. Cl.⁴ .................................. B41J 3/20
[52] U.S. Cl. .................................. 400/120; 346/76 PH; 358/298
[58] Field of Search .................................. 400/120; 346/76 PH; 358/298

[56] References Cited

U.S. PATENT DOCUMENTS

| | | | |
|---|---|---|---|
| 4,224,869 | 9/1980 | Morin | 400/120 |
| 4,335,968 | 6/1982 | Regnault | 400/120 |
| 4,399,749 | 8/1983 | Arai | 400/120 |
| 4,558,328 | 12/1985 | Takanashi et al. | 400/120 |
| 4,563,693 | 1/1986 | Masaki | 400/120 |

FOREIGN PATENT DOCUMENTS

| | | | |
|---|---|---|---|
| 0000657 | 7/1979 | European Pat. Off. | |
| 0052848 | 2/1982 | European Pat. Off. | |
| 2475496 | 8/1981 | France | |
| 92080 | 7/1981 | Japan | 400/120 |
| 120380 | 9/1981 | Japan | 400/120 |
| 130379 | 10/1981 | Japan | 400/120 |
| 57-39977 | 3/1982 | Japan | 400/120 |
| 57-57681 | 4/1982 | Japan | 400/120 |
| 58-166074 | 10/1983 | Japan | 400/120 |
| 187877 | 10/1984 | Japan | 400/120 |
| 2077970 | 12/1981 | United Kingdom | |

Primary Examiner—Edgar S. Burr
Assistant Examiner—David A. Wiecking
Attorney, Agent, or Firm—Frishauf, Holtz, Goodman & Woodward

[57] ABSTRACT

A printing apparatus includes N heating elements arranged in a line, and prints data on a label by each line by selectively supplying a current to these heating elements in accordance with printing data. The printing apparatus has a first memory for storing a plurality of line printing data constituting printing information including special information, a second memory for storing a plurality of line printing data constituting ordinary printing information, and a control unit which generates drive data corresponding to a logical sum of the one line printing data from the first memory and that from the second memory so as to cause the heating elements to be selectively energized during a first printing period of each line printing cycle. Drive data corresponding to the one line printing data from the first memory is generated so as to cause the heating elements to be selectively energized during a second printing period of each line printing cycle.

6 Claims, 11 Drawing Figures

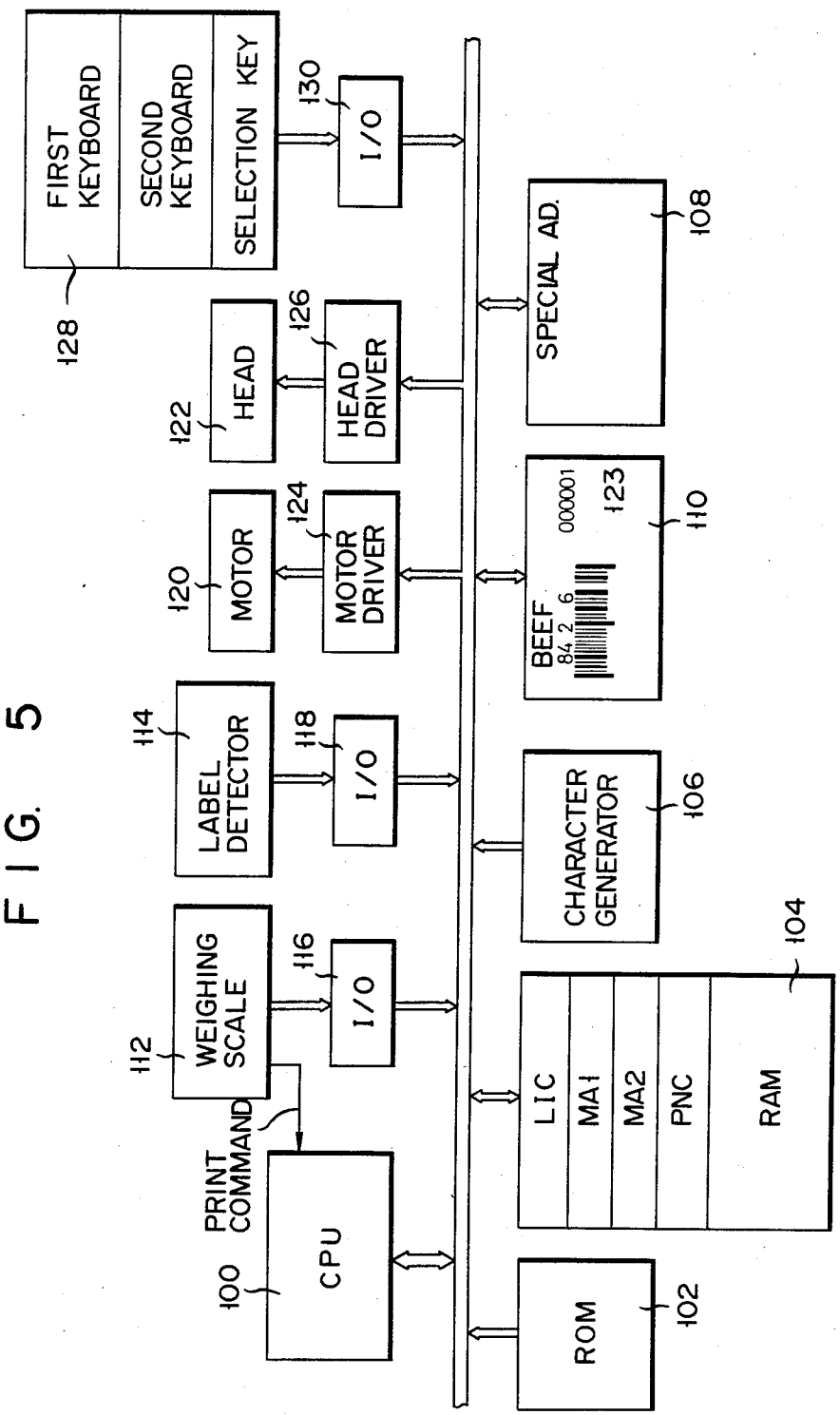
F I G. 5

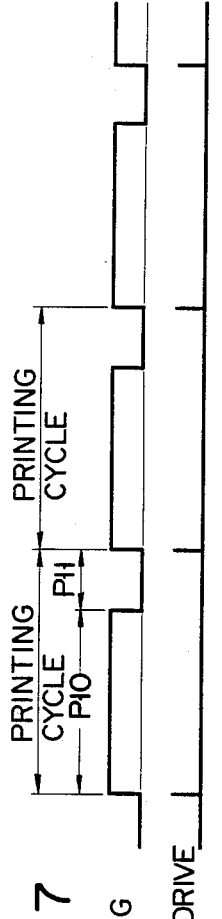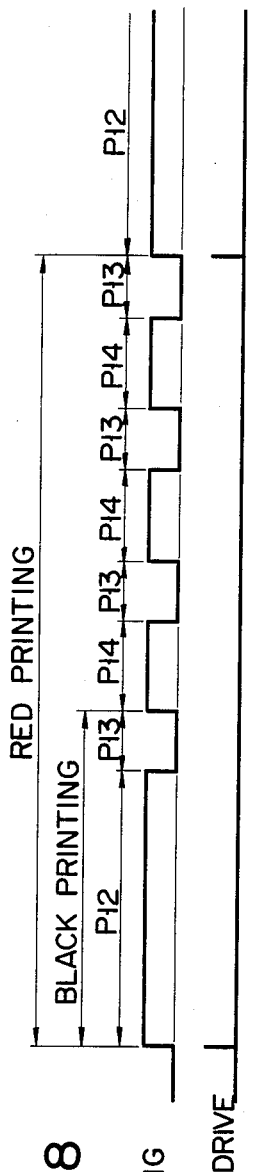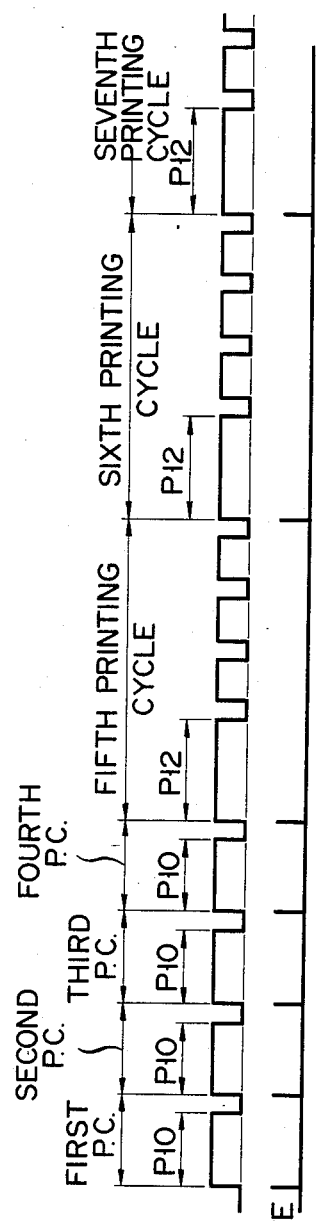

MULTI-TINT THERMAL PRINTING APPARATUS CONTROL SYSTEM

This application is a continuation of application Ser. No. 721,570, filed Apr. 10, 1985, now abandoned.

BACKGROUND OF THE INVENTION

The present invention relates to a printing apparatus which prints data including weighing data on a label with a thermal head.

Generally, in label printers, when a thermal head is used as the printing means, desirable printing patterns can be obtained, and clear bar codes can be printed. However, for example, when heat-sensitive paper for color printing or that for monochrome printing is used, the color density or the printing density of the label is always constant. For this reason, when a portion of printing information is to be emphasized, the portion must be surrounded by lines or must be indicated by bold lines. With this method, special information can be emphasized to some extent. However, the emphasized portion can only be seen if attention is paid, and cannot be recognized at a glance.

Conventionally, in order to achieve multicolor printing, a printing apparatus having two or more thermal heads provided for respective printing color has been proposed. Such a printing apparatus has a complex structure.

SUMMARY OF THE INVENTION

It is an object of the present invention to provide a printing apparatus which can print an emphasized portion of printing information by changing color or density.

In order to achieve the above object of the present invention, there is provided a printing apparatus comprising a thermal head having N heating elements arranged in a line and selectively energized in correspondence to N-bit data; first and second memories for respectively storing first and second printing infomation, the first and second printing information respectively having a plurality of line printing information to be printed on a label by means of the N heating elements; and a control unit which reads out one line printing information from each of the first and second memories, supplies, during a first printing period of each printing cycle, the N-bit data to the thermal head in accordance with a logical sum of the one line printing information read out from the first memory and the one line printing information read out from the second memory and supplies, during a second printing period of each printing cycle, the N-bit data to the thermal head in accordance with the one line printing information read out from the first memory.

According to the present invention, first printing information which is determined as special data is stored in the first memory which is separate from second printing information stored in the second memory. Therefore, printing operations for both the first and second printing information can be easily performed, and only that for the first printing information can also be easily performed. Therefore, printing periods corresponding to printing operations for the first and second printing information can be independently set. Thus, dots printed on a single line can be easily printed with different colors or densities.

BRIEF DESCRIPTION OF THE DRAWINGS

FIG. 5 is a block diagram of a printing apparatus according to another embodiment of the present invention;

FIGS. 7 to 9 are respectively timing charts for explaining an operation of the printing apparatus shown in FIG. 5.

DETAILED DESCRIPTION OF THE PREFERRED EMBODIMENTS

Figure 1:
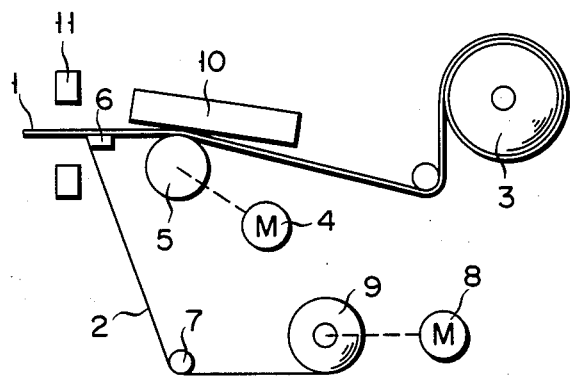
FIG. 1 is a view schematically showing a label convey mechanism of a printing apparatus according to an embodiment of the present invention.

FIG. 1 is a label convey mechanism for conveying labels 1 attached to backing paper 2 at an equal pitch and used in a printing apparatus according to an embodiment of the present invention. The backing paper 2 is wound around a label supply roller. The backing paper 2 is fed to a label peeling plate 6 through a platen 5 driven by a motor 4, and is bent downward by a distal end portion of the plate 6. Then, the paper 2 :s wound around a take-up roller 9 driven by a motor 8 through a guide roller 7.

A thermal head 10 is arranged so as to contact the label 1 located on the platen 5. A distal end portion of the label 1 peeled from the paper 2 on the plate 6 is optically detected by a detector 11. For example, when the detector 11 detects the distal end portion of the label, it generates an output signal changing from low level to high level. On the other hand, when the presence of the label is being detected, the detector 11 continuously generates a high level output signal.

Figure 2:
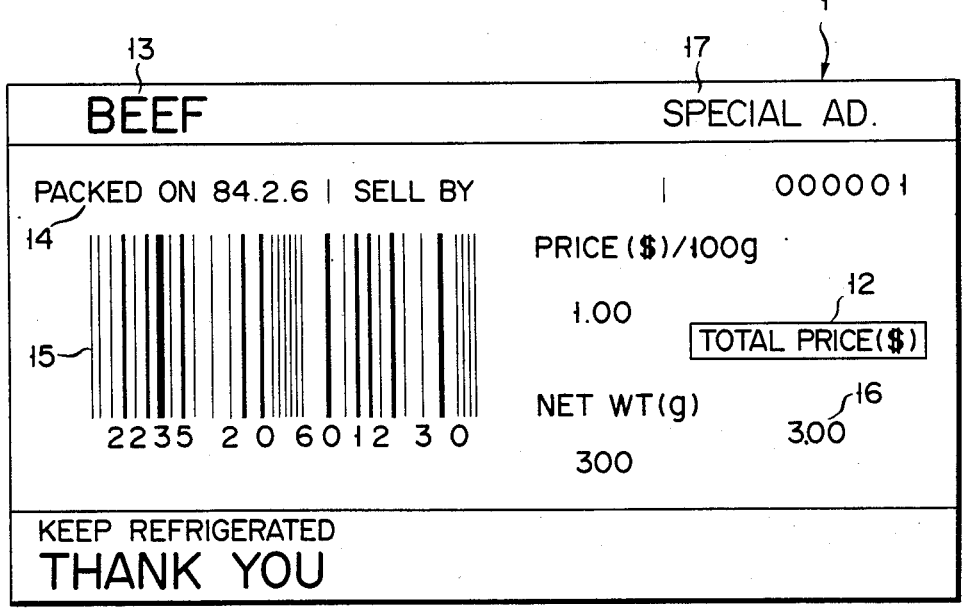
FIG. 2 is a representation showing a label on which data is printed by the printing apparatus according to the embodiment of the present invention.

FIG. 2 shows an example of contents printed on the label 1. On the label 1, fixed information 12 such as "PACKED ON", "effective date", "PRICE/100 g ($)", "NET WT (g)", "TOTAL PRICE ($)", "SELL BY", "division lines" and the like is previously printed. A name of item 13, a date 14, bar code 15, weight, unit price and total price data 16, and special information 17 are printed on the label by the thermal head 10. In this embodiment, the special information 17 "SPECIAL AD." is to be emphasized in this embodiment and is printed by a means (to be described later) with a different color or density. In this embodiment, a label comprising an upper layer containing a black color agent and a lower layer containing a red color agent is used. When this label is heated by heating elements for a short period of time, black printing is performed, and when it is heated for a long period of time, red printing is performed.

Figure 3:
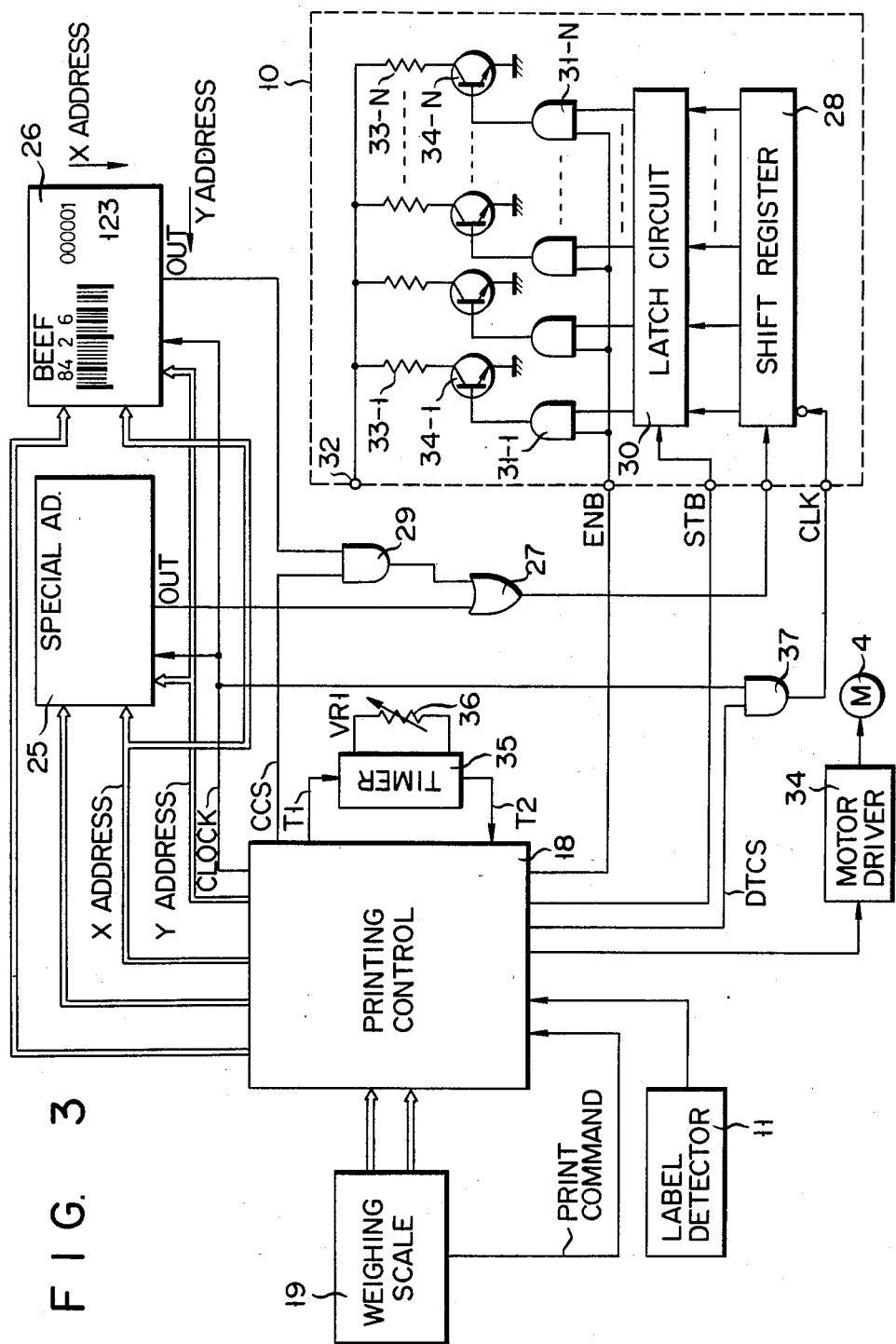
FIG. 3 is a block diagram of the printing apparatus according to the embodiment of the present invention.

FIG. 3 shows an electric circuit of the printing apparatus according to the embodiment of the present invention. A printing control 18 is provided which is operated in response to a print command or a label detecting signal. Two output ports of a weighing scale 19 are connected to the printing control 18 so as to separately supply the special data 17 and ordinary printing information. Two data output ports of the control 18 are respectively connected to a first printing buffer memory 25 for storing the special information 17 and a second printing buffer memory 26 for storing the ordinary printing information. Furthermore, the printing buffer memories 25 and 26 are connected to the control 18 through X and Y address lines, respectively.

The first printing buffer memory 25 is connected to a shift register 28 of the thermal head 10 through an OR gate 27. The second printing buffer memory 26 is connected to one input terminal of an AND gate 29 having the other input terminal connected to a color control line of the control 18. The output terminal of the AND gate 29 is connected to the OR gate 27.

An internal configuration of the thermal head 10 will be described hereinafter. Data designated by the X and Y address and read out from the buffer memories 25 and 26 is supplied to a shift register 28 by one bit in response to a clock CLK. N-bit data stored in the shift register 28 is temporarily stored in a latch circuit 30 connected in parallel to the shift register 28 in response to a strobe signal STB. The output terminals of the latch circuit 30 are respectively connected through N AND gates 31-1 to 31-N to the bases of npn transistors 34-1 to 34-N. The collectors of the transistors 34-1 to 34-N are connected to heating elements 33-1 to 33-N each having one end commonly connected to a power source 32 so as to perform control of power supply to these elements 33-1 to 33-N. The AND gates 31-1 to 31-N are enabled in response to an enable signal ENB. In this case, the conduction states of the transistors 34-1 to 34-N are controlled in accordance with data from the latch circuit 30.

The control 18 is also connected to a timer 35 serving as an ON time controller. The timer 35 starts counting response to a signal T1 generated at a period P1 from the control 18 and generates an output signal T2 which limits a time P2. The time P2 defines a period during which contents of the first and second printing buffer memories are simultaneously printed, as will be described later. The timer 35 is connected to a variable resistor 36 so as to allow the time P2 to be adjustable.

Furthermore, the control 18 is connected to a motor driver 34 connected to the motor 4, thus feeding the label 1 by one line for each printing cycle. The control 18 supplies a data transfer control signal DTCS which is changed to a high level when the Y address is located at "0" to "N" to one input terminal of an AND gate 37 having the other input terminal which receives the clock signal so as to control supply of the clock signal CLK to the shift register 28.

With this arrangement, the printing control 18 generates the strobe signal STB and the enable signal ENB when either one of the signals T1 and T2 rises. Assuming that the period P1 of the signal T1 is equal to the time required for printing one line of the label 1, the motor 4 is driven to feed the label 1 by one line every time the signal T1 is generated. Note that one line printing herein means not printing of characters for one line but that of dots for one line. The time P2 is limited by the timer 35, and the period P1 is divided into a first printing period corresponding to the time P2 and a second printing period (P1−P2). When the time P2 has elapsed after the signal T1 is generated, the output from the timer 35 changes to a high level. In the buffer memories 25 and 26, the X address indicates a row address, and the Y address indicates a column address of each row.

The control 18 fetches the special information and ordinary printing information from the first and second ouput ports of the weighing scale 19 in response to the print command therefrom and generates X and Y address data designating memory locations so as to store the readout information in the buffer memories 25 and 26. Thereafter, the control 18 periodically generates the signal T1, and transfers to the shift register 28 the special information and ordinary printing information stored in the buffer memories 25 and 26 in accordance with a timing chart shown in FIG. 4, and further transfers them to the latch circuit 30.

Figure 4:
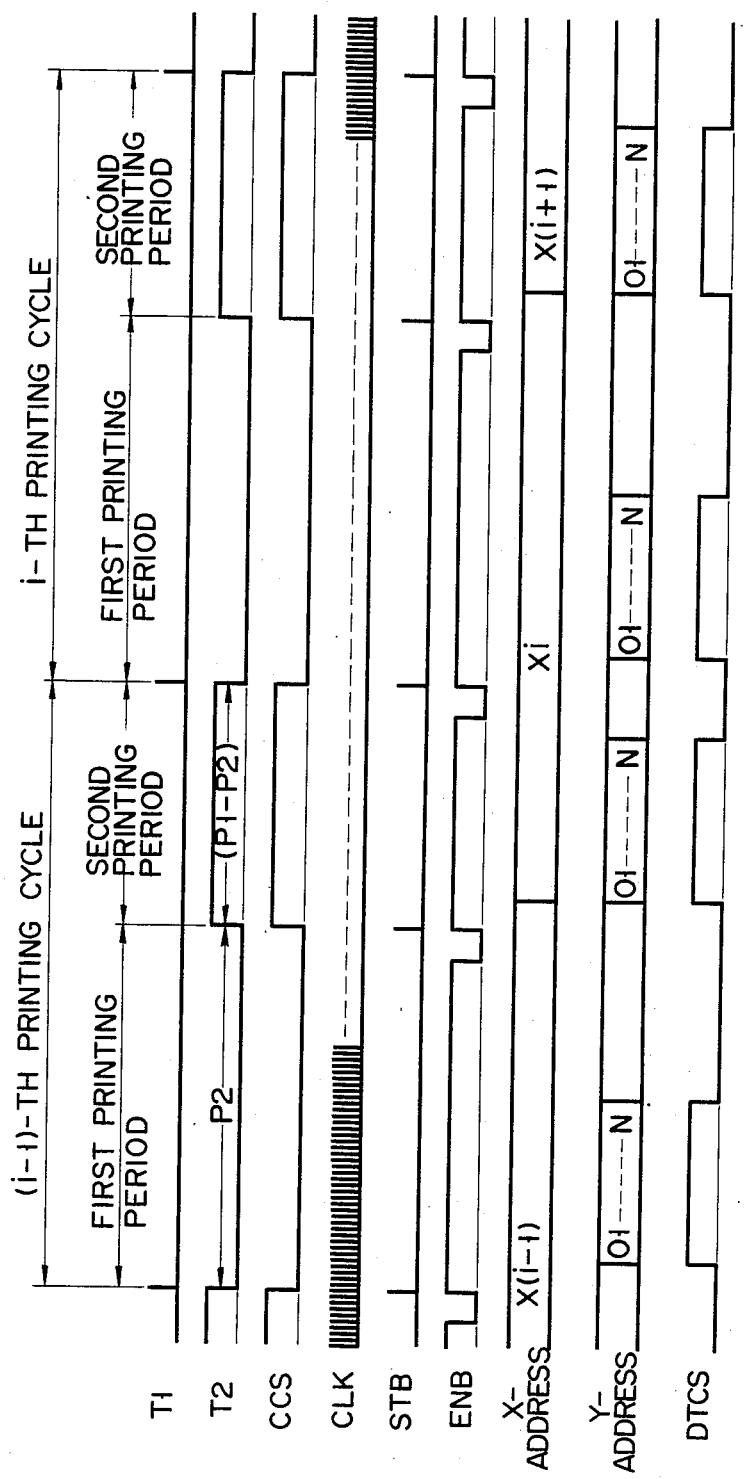
FIG. 4 is a timing chart for explaining an operation of the printing apparatus shown in FIG. 3.

Referring to FIG. 4, in order to print, for example, one line data of an i-th line, an i-th printing cycle is executed. Each printing cycle is defined by two successive signals T1. When the signal T1 is generated in the case of the X address [X(i−1)], the output signal T2 from the timer 35 is disabled, a strobe signal STB is generated, and the enable signal ENB is enabled. In this state, the control 18 sequentially updates the Y addresses from "0" to "N" in sychronism with the clock signals CLK, and thereafter sets it at, e.g., "N+1". Thus, the special information and ordinary printing information for one line are read out from the buffer memories 25 and 26. However, in this case, since a color control signal CCS generated synchronously with the signal T2 is at a low level, the AND gate 29 is disabled. Therefore, since N bits representing ordinary printing information for one line from the buffer memory 26 are prevented from being transferred, N bits representing the special information for one line from the buffer memory 25 are sequentially stored in the shift register 28. When the signal T1 is generated and the time P2 has elapsed, the timer 35 generates the high level output signal T2. Note that the enable signal ENB is set at a low level after a preset time shorter than the time P2 has elapsed. When the output signal T2 rises, the strobe signal STB is generated and the enable signal ENB is set at the high level. In response to the strobe signal STB, the N bits in the shift register 28 are latched by the latch circuit 30. Thus, the N bits in the circuit 30 are supplied to the respective bases of the transistors 34-1 to 34-N through the AND gates 31-1 to 31-N which are enabled by the enable signal ENB, thus controlling conduction states of the transistors 34-1 to 34-N. Therefore, a current is selectively supplied to the heating elements 33-1 to 33-N in accordance with N bits stored in the latch circuit 30.

In response to the leading edge of the signal T2, the control 18 increments the X address so as to set it at X1, and sequentially updates the Y address from "0" to "N". In the same manner as described above, N bits representing the special information and ordinary printing information for the next one line are read out from the buffer memories 25 and 26. In this case, since the color control signal is at the high level, the N bits from the buffer memory 25 are supplied to the shift register 28 through the AND gate 29 and OR gate 27 and at the same time the N bits from the buffer memory 26 are also supplied thereto through the OR gate 27. The N bits stored in the shift register 28 are latched by the latch circuit 30 when the next signal T1 is generated after the time P1 has elapsed from the generation of the previous signal T1, i.e., in response to the strobe signal STB which is generated when the i-th printing cycle is started. The heating elements 33-1 to 33-N are selectively energized in accordance with the N bits latched in the latch circuit 30. In other words, N bits corresponding to the logical sum of the N bits representing the special information and the N bits representing the ordinary printing information which are read out from the buffer memories 25 and 26 for one line designated by the X address Xi are printed on one line of the label 1.

During the first printing period of the i-th printing cycle during which the above printing operation is executed, the N bits in the buffer memory 25 designated by the X address Xi are sequentially transferred to the shift register 28 in the same manner as described above. The N bits stored in the shift register 28 are latched by the latch circuit 30 when the printing operation of the first printing period ends, i.e., in response to the strobe signal STB generated when the signal T2 rises during the i-th printing cycle. The printing operation is performed during the second printing period in accordance with the N bits latched in the latch circuit 30. When the second printing period starts, the X address is incremented and is set to be X(i+1). Thus, in the same manner as described above, the N bits for the line designated by the X address X(i+1) are read out from each of the buffer memories 25 and 26, and N bits corresponding to the readout N-bit data are stored in the shift register 28.

In this manner, in this embodiment, each printing cycle is divided into the first and second printing periods. During the first printing period, the N bits corresponding to the logical sum of the N bits in the buffer memory 25 designated by the X address Xi and those in the buffer memory 26 designated by the X address Xi are printed. During the second printing period, only the N bits in the buffer memory 25 designated by the X address Xi are printed. Therefore, the time required for printing the special information in the buffer memory 25 is longer than that required for printing ordinary printing information in the buffer memory 26. Thus, the special information is printed with a different color or density and can be easily and clearly distinguished from ordinary printing information.

Note that in practice, the variable resistor 36 can be properly set so as to set the time P2 in accordance with the heat sensitive property of the label 1.

FIG. 5 shows a block diagram of a printing apparatus according to another embodiment of the present invention. The printing apparatus comprises a central processing unit (CPU) 100, a read-only memory (ROM) 102 connected to the CPU 100 through a data bus and storing a control program and the like, and a random-access memory (RAM) 104 for temporarily storing weighing data, character code data and the like. The CPU 100 is connected to a character generator 106, a buffer memory 108 for storing special information, and a buffer memory 110 for storing ordinary printing information. Furthermore, a weighing scale 112 and a label detector 114 are respectively coupled to the CPU 100 through I/O ports 116 and 118. A paper feed motor 120 and a thermal head 122 are coupled to the CPU 100 through a motor driver 124 and a head driver 126, respectively. The CPU 100 is coupled to a key-in unit 128 including first and second keyboards and a special information selection key through an I/O port 130.

Figure 6A:
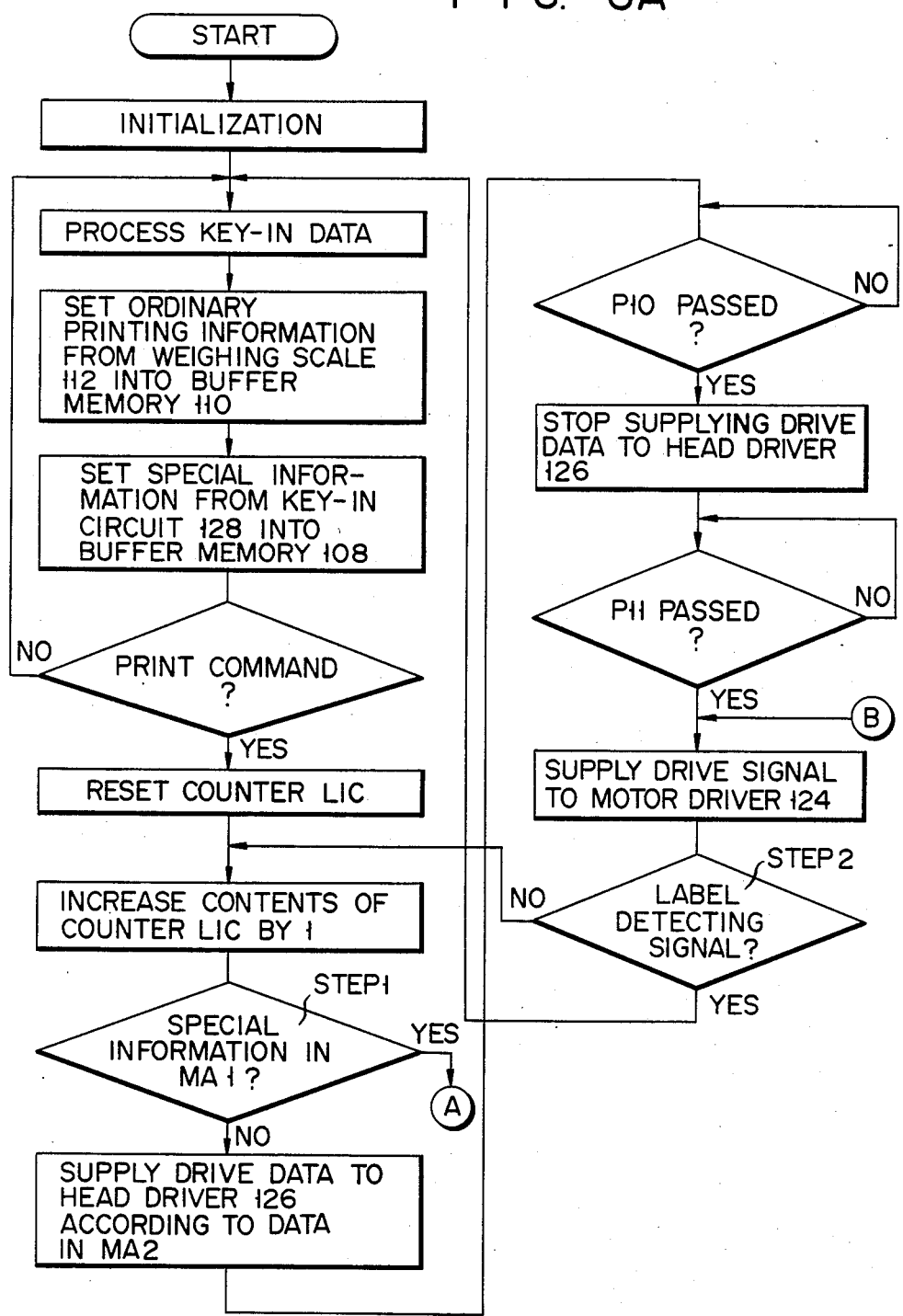
FIGS. 6A and 6B are flow charts of a program executed by the printing apparatus shown in FIG. 5.
Figure 6B:
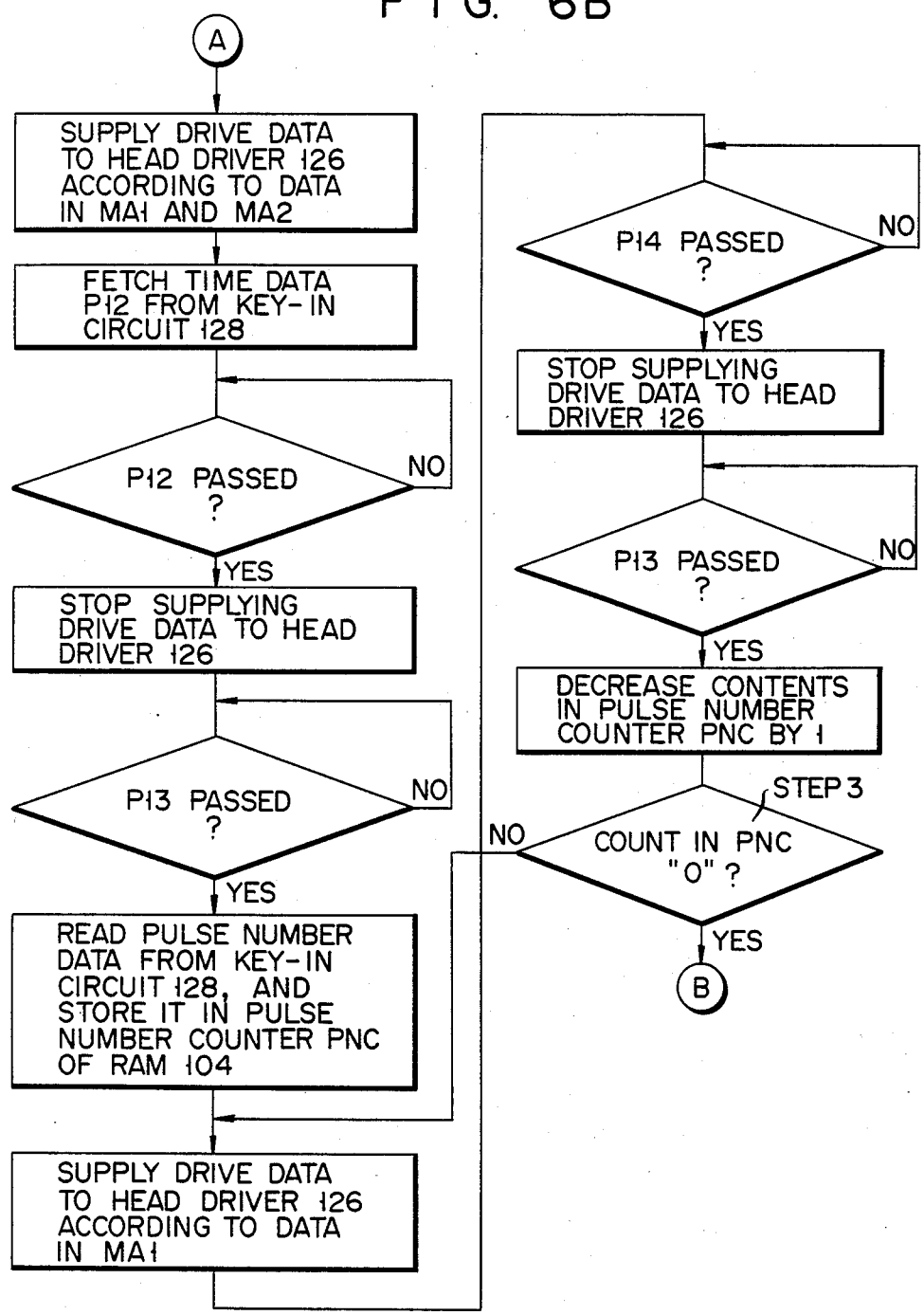

Operation of the printing apparatus shown in FIG. 5 will be described hereinafter with reference to flow charts shown in FIGS. 6A and 6B and timing charts shown in FIGS. 7 to 9. After executing the initialization process, the CPU 100 detects the state of the mode key, and after detecting that a key such as pulse number setting key is operated, stores printing information such as a unit price, weight, total price and the like in the buffer memory 110, and then stores the special information, e.g., "SPECIAL AD." selected by the special information selection key of the key-in circuit 128 in the buffer memory 108. Thereafter, the CPU 100 checks if the weighing scale 112 has generated a printing command. If the CPU 100 detects that no printing command is generated, the CPU 100 executes the same operation described above, and stores the printing information from the weighing scale 112 and the special information from the key-in circuit 128 in the buffer memories 110 and 108, respectively. On the other hand, if the CPU 100 detects that the printing command is generated, it sets a line counter LIC in the RAM 104 at "1", and thereafter, reads out the corresponding N-bit data at the respective first lines from the buffer memories 108 and 110 so as to store them in first and second memory areas MA1 and MA2 in the RAM 104. In this case, the CPU 100 checks in STEP 1 if bit data constituting a portion of the special information to be printed is included in the N-bit data transferred to the RAM 104 from the buffer memory 108. If it is NO in STEP 1, the CPU 100 supplies the N-bit data in the memory area MA2 to the head driver 126 so as to energize the thermal head 122 in accordance with a timing chart shown in FIG. 7. In other words, the CPU 100 supplies drive data to the head driver 126 so that the thermal head 122 is energized during a predetermined period P10 by the driver 126 in accordance with the N-bit data in the memory area MA2. Thus, the black dots in accordance with the N-bit data in the memory area MA2 are printed on the label 1. Thereafter, during a predetermined period P11, the CPU 100 inhibits the head driver 126 from energizing the thermal head 122, and rotates the motor 120 by a given angle so as to feed the label 1 by a given distance. In STEP 2, the CPU 100 checks if the label detecting signal is generated from the detector 114. If it is YES in STEP 2, the CPU 100 executes the key-in data processing again. If it is NO in STEP 2, the CPU 100 increments the line counter LIC by one, and executes the printing operation in accordance with the N-bit data for the next line.

In STEP 1, when the CPU detects that the N-bit data in the memory area MA1 include bit data constituting a portion of the special information, it supplies the N-bit data corresponding to a logical sum of the N-bit data in the memory area MA1 and that in the memory area MA2 to the head driver 126 so as to energize the thermal head 122 in accordance with a timing chart shown in FIG. 8. In other words, the CPU 100 supplies the drive data to the head driver 126 so that it energizes the thermal head 122 in accordance with the N-bit data corresponding to the logical sum of the respective N-bit data in the memory areas MA1 and MA2 for a predetermined period P12 set by the second keyboard of the key-in circuit 128. Thus, black dots corresponding to the N-bit data of the logical sum are printed on the label 1. Thereafter, during a predetermined period P13, the CPU 100 inhibits the head driver 126 from energizing the thermal head 122, and sets a numeral "m" set by the first keyboard of the key-in circuit 128 in a pulse number counter PNC in the RAM 104. The CPU 100 then supplies the drive data to the head driver 126 so that it energizes the thermal head 122 in accordance with the N-bit data in the memory area MA1 for a predetermined period P14. Thus, among the black dots which were previously printed on the label 1, those corresponding to the new N-bit data are changed into red dots. Thereafter, the CPU 100 sets the head driver 126 in a rest state for the predetermined interval P13, and thereafter, decrements the content of the counter PNC by one. Then, in STEP 3, it is checked if the content of the counter PNC is 0. If it is NO in STEP 3, the CPU 100 sets the head driver 126 in an energized state for the predetermined period P14. If it is YES in STEP 3, the CPU 100 supplies a motor drive signal to the motor driver 124 so as to drive the motor 120 by a given angle, thus feeding the label 1 by a predetermined distance.

In this manner, when the N-bit data includes the bit data constituting the ordinary printing information and a portion of the special information, in order to print the ordinary printing information, the corresponding heating elements are energized for the period P12, and in order to print the special information, the corresponding heat elements are energized for a period (P12+m×P14). In the timing chart shown in FIG. 7, "m" is set at "3". Thus, the ordinary printing information is printed in black, and the special information is printed in red.

It should be noted that the period P12 which is set by the second keyboard of the key-in circuit 128 must be set to be longer than the period P10. This is because when the N-bit data which does not include the bit data constituting a portion of the special information is sequentially read out from the buffer memory 110, the head driver 126 is alternately set at the energized and rest states, and the ordinary printing information can be effectively printed in black. In this case, since the head driver 126 is repeatedly energized at an interval of the relatively short period P11, heat remains in the heating elements which were energized in the previous printing cycle when the next printing cycle starts. However, when the ordinary printing information and the special information are printed, the time {(m+1)×P13+m×P14} elapses and then the heating elements which were energized for printing the ordinary printing information in black are energized in the next printing cycle, and the temperature of the heating elements is sufficiently lowered. Therefore, in this case, in order to effectively perform black printing, it is important to set the period P12 to be long. Note that the period P11 can be set to be the same as the period P13.

Referring to a timing chart shown in FIG. 9, only the ordinary printing information is printed during the first to fourth printing cycles, i.e., black printing is executed, and during the fifth to seventh printing cycles, the ordinary printing information and the special information are printed, i.e., black and red printing operations are simultaneously performed. As can be seen from FIG. 9, in the black printing operation, an interval of each printing cycle is set to be short. When the heating elements are energized to print, e.g., bar codes during the continuous printing cycles, the corresponding heating elements do not radiate heat, and the energizing time P10 can be set to be short. When the black and red printing operations are performed, an interval of each printing cycle is set to be long. When the heating elements are energized for the black printing during the continuous printing cycles, the corresponding heating elements can sufficiently radiate heat. Thus, the energizing time P12 must be set to be relatively long.

In this embodiment, since the pulse number m for executing red printing and the length of the time P12 can be desirably set by the first and second keyboards of the key-in circuit 128, they can be set at minimal values in accordance with the heat-sensitive characteristics of the label 1.

Figure 10:
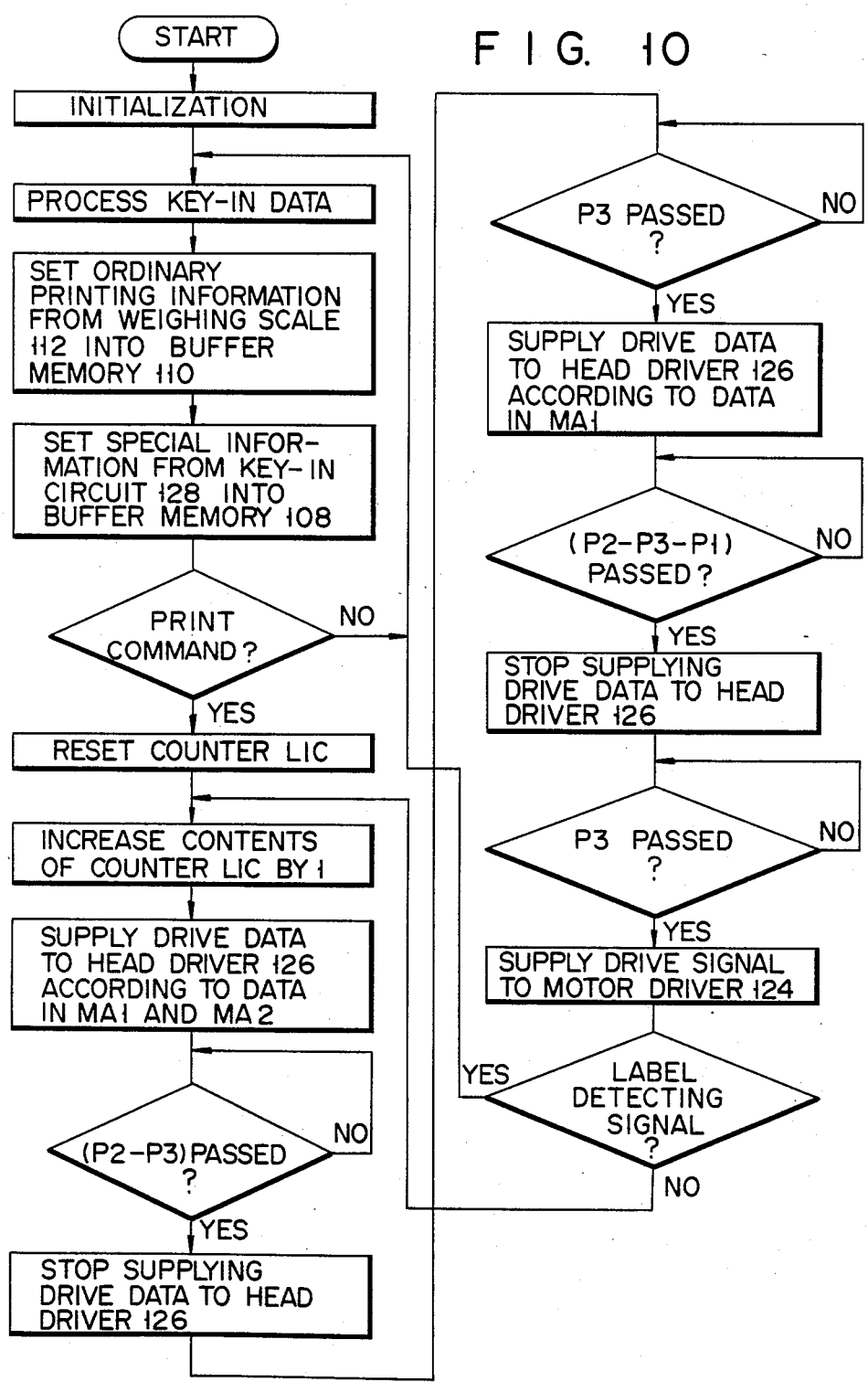
FIG. 10 is a flow chart of a program of the printing apparatus shown in FIG. 5 which can function the same as that shown in FIG. 3.

FIG. 10 is a program flow chart for executing the same function as that of the printing device shown in FIG. 3 using the printing device shown in FIG. 5. In this case, after executing the initialization process, the CPU 100 detects the mode key, and after detecting that a key operation is effected, stores the ordinary printing information from the weighing scale 112 in the buffer memory 110, in the same manner as described above. Then, the CPU 100 stores the special information from the key-in circuit 128 in the buffer memory 108. When the print command from the weighing scale 112 is detected, the CPU 100 sets the content of the counter LIC at "1". Thereafter, the CPU 100 reads out the N-bit data for the first line from each of the buffer memories 108 and 110 and stores them in the first and second memory areas MA1 and MA2 of the RAM 104. Then, the CPU 100 supplies the drive data to the head driver 126 for a predetermined period of time (P2−P3) in accordance with the N-bit data corresponding to the logical sum of the N-bit data stored the memory area MA1 and the N-bit data stored in MA2. Note that the time P3 corresponds to a period of time from when the enable signal ENB falls until it rises again. Thereafter, the CPU 100 stops supplying the drive data to the head driver 126 for the period of time P3. Then, the CPU 100 supplies the drive data to the head driver 126 for a predetermined period of time (P1−P2−P3) in accordance with the N-bit data in the memory area MA1. The CPU 100 stops supplying the drive data to the head driver 126 for the period of time P3, and thereafter supplies the motor drive signal to the motor driver 124 so as to rotate the motor 120 by a given angle.

In this manner, when one printing cycle is completed, the CPU 100 increments the contents of the counter LIC by one, and reads out the N-bit data for the next line from the buffer memories 108 and 110, thus performing the same processing as described above.

The present invention has been described with reference to the particular embodiments, but it is not limited to the above embodiments. For example, in the above embodiments, during each printing cycle, dots to be printed in black and red are printed in black first, and thereafter, the dots to be printed in red among the printed dots are further heated. However, at the beginning of the printing cycle, the dots to be printed in red can be printed in black or red, and then the dots to be printed in black are heated together with the previously printed dots so that the dots are selectively printed in red and black.

Furthermore, the special information can be not only data from the key-in circuit 128 but also data from the weighing scale 112, e.g., data associated with a unit price so as to be stored in the buffer memory 108.

What is claimed is:
1. A printing apparatus, comprising:
heating means having N heating elements arranged in a line and which are selectively energized in accordance with input N-bit data;
driving means for supplying the N-bit data to said heating means in accordance with input drive data;
at least first and second memory means for respectively storing first and second printing data having a plurality of line printing data to be printed on a label by said heating elements; and control means including means for reading out printing data of one line from each of said first and second memory means, first supply means for supplying to said driving means drive data corresponding to a logical sum of the printing data of one line read out from said first memory means and that read out from said second memory means, thereby causing said driving means to supply N-bit data from said first supply means to said heating means during a first printing period of each line printing cycle, and second supply means for supplying to said driving means drive data corresponding to the printing data of said one line read out from said first memory means, thereby causing said driving means to supply N-bit from said second supply means to said heating means during a second printing period of said line printing cycle; said first printing data stored in said first memory means including special information data; said control means further includes means for setting a different printing mode upon detection that the printing data of one line stored in said first memory means does not include a part of said special information data; wherein in said different printing mode, each line printing cycle comprises a third printing period shorter than said first printing period; and said control means further includes means for supplying to said driving means, during said third printing period, drive data corresponding to the printing data of one line stored in said second memory means.

2. An apparatus according to claim 1, wherein said logical sum drive data is continuously suppled to said driving means during said first printing period.

3. A printing apparatus, comprising:
heating means having N heating elements arranged in a line and which are selectively energized in accordance with input N-bit data;
driving means including a single N-bit storing means for storing N-bit data corresponding to input drive data, and a driving circuit for supplying the N-bit data in said N-bit storing means to said heating means;
at least first and second memory means for respectively storing first and second printing data, each of said first and second printing data including a plurality of N-bit line printing data to be printed on a label by said heating elements; and
control means including means for reading out printing data of one line from each of said first and said second memory means, means for supplying to said N-bit storing means of said driving means drive data corresponding to a logical sum of the printing data of one line read out from said first memory means and that read out from said second memory means so that said driving means supplies N-bit data to said heating means during a first printing period of each line printing cycle, and means for supplying to said N-bit storing means of said driving means drive data corresponding to the printing data of said one line read out from said first memory means, so that said driving means supplies N-bit data to said heating means during a second line printing period of said line printing cycle;
said first and said second memory means each comprising a memory area for storing each of the first and the second printing data which are capable of being designated by substantially the same address;
said control means comprising:
third memory means having first and second memory areas for respectively storing the printing data of one line from said first and said second memory means; and a counter; and
a data processing unit including first supply means for supplying to said driving means, during said first printing period of a line printing cycle, the drive data corresponding to a logical sum of the printing data of one line stored in said first memory area and that stored in said second memory area so that said driving means supplies N-bit data to said heating means during said first printing period of each line printing cycle; and second supply means for intermittently supplying to said driving means, during said second printing period of the line printing cycle, the drive data corresponding to the printing data of said one line stored in said first memory area, so that said driving means supplies N-bit data to said heating means during said second printing period of said line printing cycle; and
said data processing unit further including means for updating a content of said counter of said third memory means every time said second supply means intermittently supplies, during said second printing period, the drive data corresponding to the printing of said one line stored in said first memory area; detecting means for detecting the content of said counter of said third memory means; and means for stopping the generation of the drive data corresponding to the printing data of said one line stored in said first memory area when said detecting means detects that the content of said counter of said third memory means has reached a predetermined value;
wherein:
said first printing data stored in said first memory means includes special information data;
said data processing unit further includes means for setting a different printing mode upon detection that the printing data of one line stored in said first memory means does not include a part of said special information data;
wherein in said different printing mode, each line printing cycle comprises a third printing period shorter than said first printing period; and
said data processing unit further includes means for supplying to said driving means, during said third printing period, drive data corresponding to the printing data of one line stored in said second memory means.

4. An apparatus according to claim 3, wherein said logical sum drive data is continuously supplied to said driving means during said first printing period.

5. A printing apparatus, comprising:
heating means having N heating elements arranged in a line and which are selectively energized in accordance with input N-bit data;
driving means including a single N-bit storing means for storing N-bit data corresponding to input drive data, and a driving circuit for supplying the N-bit data in said N-bit storing means to said heating means;
at least first and second memory means for respectively storing first and second printing data, each of said first and second printing data including a plurality of N-bit line printing data to be printed on a label by said heating elements; and control means including means for reading out printing data of one line from each of said first and said second memory means, means for supplying to said N-bit storing means of said driving means drive data corresponding to a logical sum of the printing data of one line read out from said first memory means and that read out from said second memory means so that said driving means supplies N-bit data to said heating means during a first printing period of each line printing cycle, and means for supplying to said N-bit storing means of said driving means drive data corresponding to the printing data of said one line read out from said first memory means, so that said driving means supplies N-bit data to said heating means during a second printing period of said line printing cycle;

said control means comprising:

third memory means having first and second memory areas for respectively storing the printing data of one line from said first and said second memory means; and a counter; and a data processing unit includng first supply means for supplying to said driving means during said first printing period of a line printing cycle, the drive data corresponding to a logical sum of the printing data of one line stored in said first memory area and that stored in said second memory area so that said driving means supplies N-bit data to said heating means during said first printing period of each line printing cycle; and second supply means for intermittently supplying to said driving means, during said second printing period of the line printing cycle, the drive data corresponding to the printing data of said one line stored in said first memory area, so that said driving means supplies N-bit data to said heating means during said second printing period of said line printing cycle; and said data processing unit further including means for updating a content of said counter of said third memory means every time said second supply means intermittently supplies, during said second printing period, the drive data corresponding to the printing data of said one line stored in said first memory area; detecting means for detecting the content of said counter of said third memory means; and means for stopping the generation of the drive data corresponding to the printing data of said one line stored in said first memory area when said detecting means detects that the content of said counter of said third memory means has reached a predetermined value;

wherein:

said first printing data stored in said first memory means includes special information data;

said data processing unit further includes means for setting a different printing mode upon detection that the printing data of one line stored in said first memory means does not include a part of said special information data;

wherein in said different printing mode, each printing cycle comprises a third printing period shorter than said first printing period; and said data processing unit further includes means for supplying to said driving means, during said third printing period, drive data corresponding to the printing data of one line stored in said second memory means.

6. An apparatus according to claim 5, wherein said logical sum drive data is continuously supplied to said driving means during said first printing period.

* * * * *